United States Patent [19]

Takegawa

[11] 4,253,633
[45] Mar. 3, 1981

[54] MOUNTING OF OUTSIDE REAR VIEW MIRROR ON MOTOR VEHICLE BODY

[75] Inventor: Tetuo Takegawa, Yokosuka, Japan

[73] Assignee: Nissan Motor Company, Limited, Yokohama, Japan

[21] Appl. No.: 51,134

[22] Filed: Jun. 22, 1979

[30] Foreign Application Priority Data

Jun. 27, 1978 [JP] Japan .................................. 53-87479

[51] Int. Cl.³ .......................... F16C 1/10; A47F 7/14
[52] U.S. Cl. ............................. 248/475 B; 74/501 M; 248/222.1; 248/222.3; 248/205 R; 248/231.1
[58] Field of Search ............. 248/475 B, 222.1, 222.3, 248/205 R, 231.1; 74/501 M

[56] References Cited

U.S. PATENT DOCUMENTS

| 2,724,996 | 11/1955 | O'Shei | 248/475 B |
| 3,188,913 | 6/1965 | O'Shei | 248/475 B |
| 3,443,783 | 5/1969 | Fisher | 248/222.3 |
| 4,197,762 | 4/1980 | Yamana | 74/501 M |

Primary Examiner—Robert L. Wolfe

[57] ABSTRACT

An outside rear view mirror of a flexible type is arranged to be easily mounted on a vehicle body. A mirror mounting body is coupled, by means of a stud and a spring, with a base member having on the bottom angled hooks to provide an assembly. This assembly is mounted on a vehicle body by inserting the angled hooks into apertures formed through a vehicle body panel and thereafter from the inside of the body panel, a clip is engaged with the hooks to secure the assembly to the body panel.

5 Claims, 7 Drawing Figures

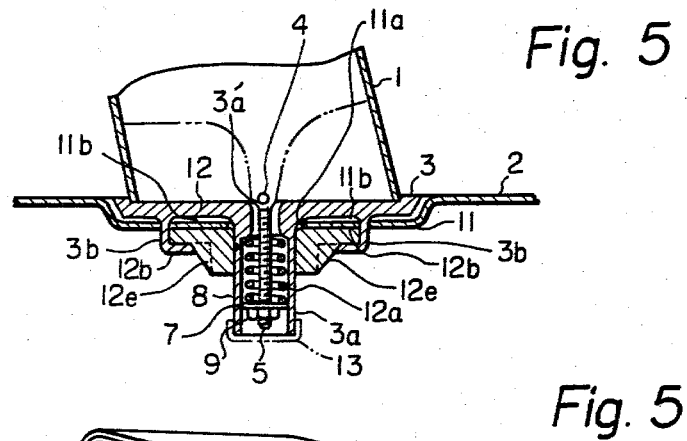
Fig. 5
Fig. 5a
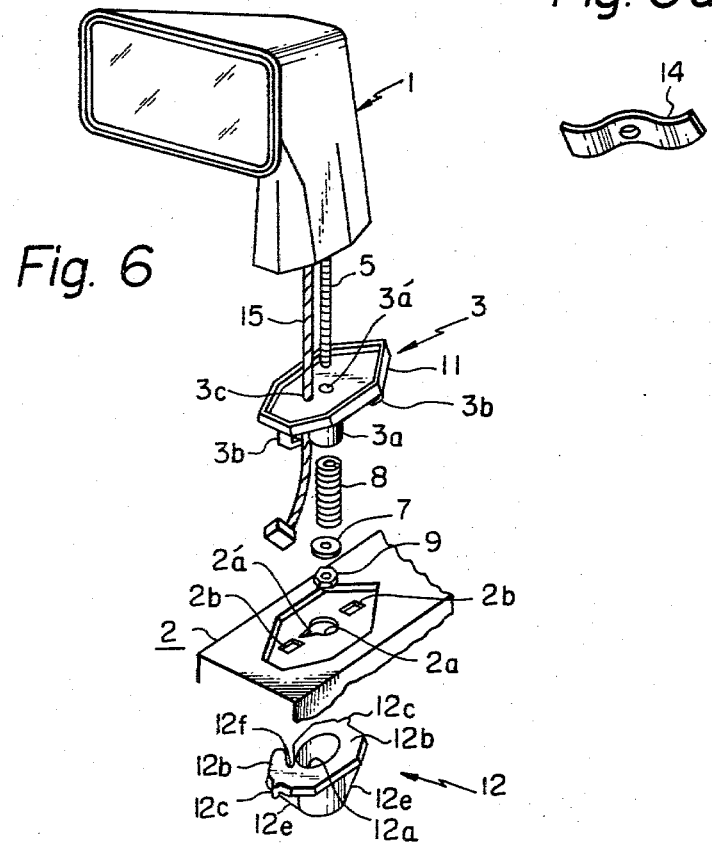
Fig. 6

4,253,633

MOUNTING OF OUTSIDE REAR VIEW MIRROR ON MOTOR VEHICLE BODY

BACKGROUND OF THE INVENTION

This invention relates to a motor vehicle comprising an outside rear view mirror of a flexible type which is arranged to incline together with its stay in case of a collison, for example, with a pedestrian so as to prevent him from being injured and to resume the original state spontaneously and more particularly to a novel manner of mounting an outside rear view mirror of such a type on a vehicle body panel.

FIGS. 1 and 2 illustrate a conventional manner of mounting an outside rear view mirror body on an automobile body panel. In FIGS. 1 and 2 a mirror mounting body 1 is pivotally connected to a stud 5 by means of a pin 4, and the stud 5 is inserted into an aperture 2a formed through an automobile body panel 2 such as a front fender with a base 3 interposed between the mirror mounting body 1 and the body panel 2. Thereafter, from the inside of the body panel 2, a helical spring 8 is disposed around the stud 5 and a nut 9, interposing a washer 7, is tightened on a threaded lower end of the stud 5, by the use of a tool 6 such as a box-type spanner, to compress the spring 8 thereby to secure the mirror mounting body 1 to the body panel 2. Thereafter, a hold case 10 is attached to the inside of the body panel 2 to cover the stud 5 and the spring 8.

According to such a design, the parts of the mirror body and tools such as a box spanner specific to the mirror body must be introduced inside the fender through a narrow gap between an arched edge 2c of the fender and a wheel, and the complicatedness of work inside the wheel arch forces the worker to keep an uncomfortable posture for a long time.

Therefore, such work is unfavorable as a step on an assembly line from a viewpoint of safety of work. Moreover, there is some possibility that the nut is tightened either insufficiently or so excessively that the thread is destroyed. When the mirror body has to be disassembled and reassembled because of repairing of the vehicle body such as re-painting of renewal of the mirror, the situation is the same as in the initial assembly process. Furthermore, the screwed members are likely to get rusty due to muddy water splashed during driving the vehicle so that it becomes difficult to disassemble the mirror body.

SUMMARY OF THE INVENTION

It is an object of the present invention to provide a motor vehicle comprising an outside rear view mirror of a flexible type, featuring a remarkable ease in mounting it on a vehicle panel.

According to this invention, such members as a mirror mounting body, a base member, a helical spring, a washer and a nut are made into an assembly prior to mirror mounting process and then this assembly is inserted into apertures formed through a vehicle body panel. Thereafter, from the inside of the body panel, a clip is set to the assembly and just turned through about 90° to secure the assembly to the body panel.

BRIEF DESCRIPTION OF THE DRAWINGS

FIG. 5 is a sectional view of a mounting part of the outside rear view mirror unit of FIG. 4;

FIG. 5a is a perspective view of a waved leaf spring optionally used in this invention; and FIG. 6 is an exploded perspective view of another embodiment of the invention.

DESCRIPTION OF THE PREFERRED EMBODIMENT

Figure 1:
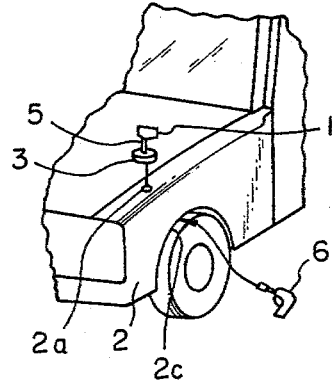
FIG. 1 illustrates a conventional method of mounting an outside rear view mirror on an automobile body.
Figure 2:
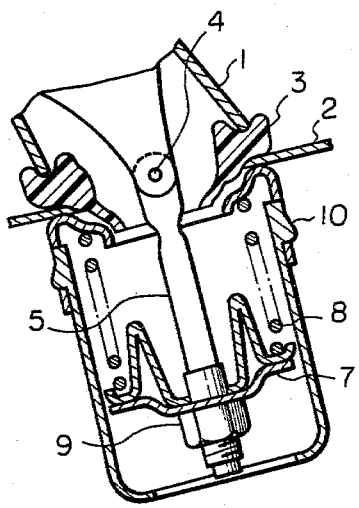
FIG. 2 is a sectional view of a conventional fastening mechanism for an outside rear view mirror.
Figure 3:
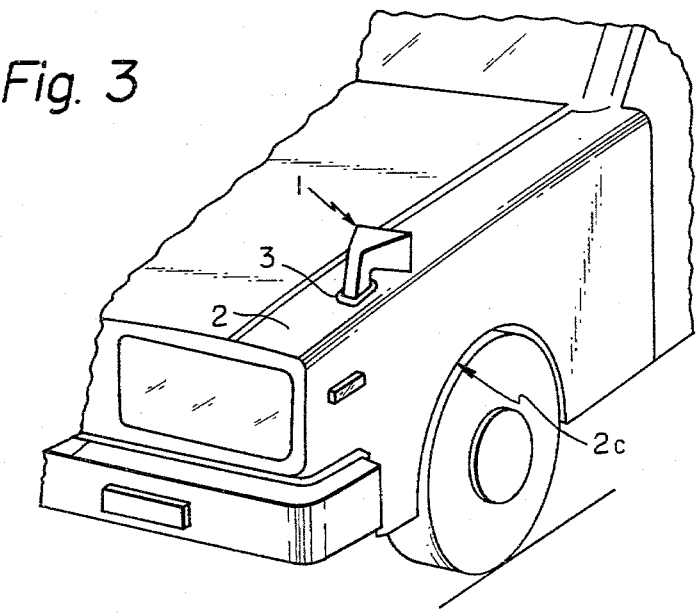
FIG. 3 is a perspective view of a front part of an automobile having an outside rear view mirror unit according to the invention.
Figure 4:
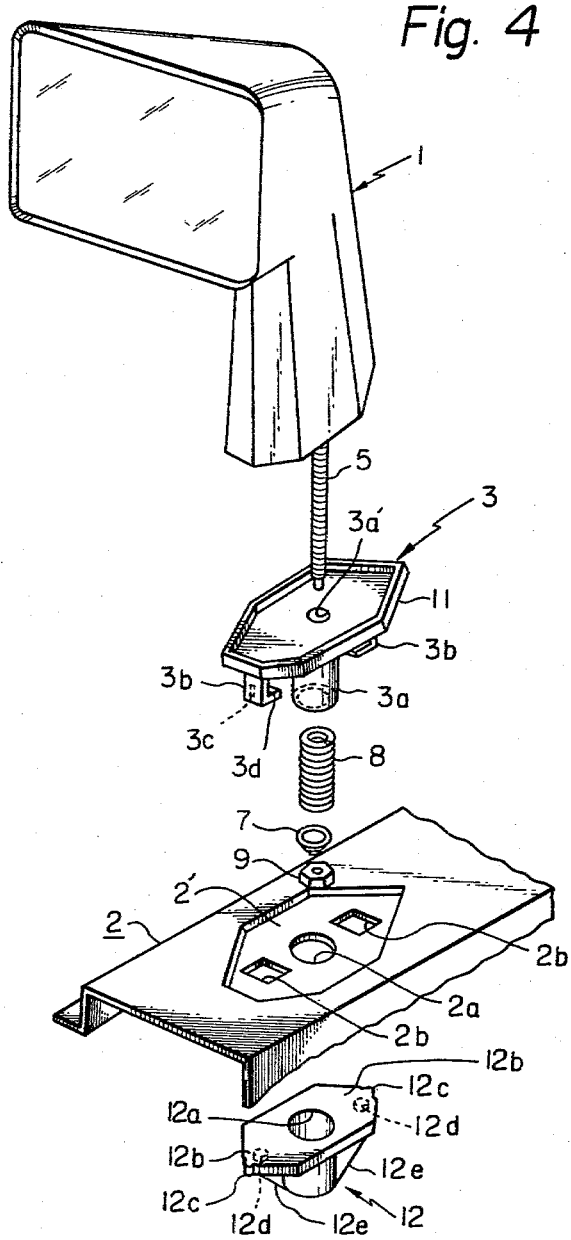
FIG. 4 is an exploded perspective view of an outside rear view mirror unit as an embodiment of the invention.

Referring to FIGS. 3–5, a front fender panel 2 of an automobile is formed with a recess 2' on an outer and upper surface to receive a base member 3 of an outside rear view mirror assembly, and in the center of the recess 2' a first aperture 2a of a circular shape is bored through the front fender panel 2 and at both sides of the first aperture 2a two second apertures 2b of a rectangular shape are bored through the front fender panel 2. In this embodiment the base member 3 is a polygonal plate and has a tubular portion 3a protruding from the bottom face to fit into the first aperture 2a of the panel 2 and two angled, generally L-shaped, hooks 3b which project from the bottom side in an opposite arrangement with respect to the tubular portion 3a and are arranged to be inserted into the second apertures 2b, respectively. In the center of the top end of the tubular portion 3a, a small aperture 3a' is formed in the base member 3. Reference numeral 11 indicates a sheet made of a resilient material such as polyvinyl chloride or nitrile rubber, which is placed between the panel 2 and the base member 3 to ensure tight fitting thereof. The sheet 11 is formed with a first aperture 11a corresponding to the tubular portion 3a of the base member 3 and two second apertures 11b corresponding to the two angled hooks 3b of the base member 3, respectively. Reference numeral 12 is a clip to fasten the outside rear view mirror assembly to the vehicle body panel 2. In this embodiment, the clip 12 is in a form of an elongated hexagonal plate having centrally on the bottom a cylindrical portion and a circular hole 12a through which the tubular portion 3a of the base member 3 is to be fitly inserted, is made centrally through the platy portion and the cylindrical portion of the clipping member 12. The clip 12 has at the both ends across the longer dimension of the platy portion two claw portions 12b shaped to engage with the two angled hooks 3b, respectively. Each claw portion 12b has at the utmost end a first projection 12c arranged to be caught in a first dent 3c formed in each angled hook 3b and at the bottom a second projection 12d arranged to be caught in a second dent 3d formed in each angled hook 3b, so that the clip 12 can be secured to the base member 3. The clip 12 has two ribs 12e on both sides of the cylindrical portion to facilitate manual turning of the clip 12.

According to this invention, first the mirror mounting body 1 and the base member 3 are assembled together, prior to a mirror mounting process, to provide a mirror assembly. More particularly, the stud 5 connected to the mirror mounting body 1 is inserted into the aperture 3a' of the base member 3 from the top side of the base member 3 and a spring 8 is disposed in the tubular portion 3a of the base member 3 from the bottom side of the base member. Thereafter, a nut 9 is fitted to a threaded lower end of the stud 5 together with a washer 7 to compress the spring 8 against the bottm face of the base member 3.

Secondly, the tubular portion 3a and two angled hooks 3b of the assembly are inserted respectively into the corresponding apertures 2a and 2b bored through the fender panel 2, interposing the sheet 11 as a buffer between the base member 3 and the fender panel 2. Thereafter, the clip 12 is introduced inside the fender panel 2 through a space between a wheel and an arched edge 2c of the fender panel 2 and coupled with the base member 3 in such a manner that the hole 12a of the clip 12 receives the tubular portion 3a of the base member 3. Then the clip 12 is turned through about 90° so that the two claw portions 12b of the clip 12 are forcibly and tightly engaged with the two angled hooks 3b, respectively, to secure the mirror assembly to the body panel 2.

Furthermore, the lower end of the tubular portion 3a of the base member 3 protruding through the hole 12a of the clip 12 is preferably covered with a cap 13, as shown in FIG. 5, to prevent muddy water splashed during driving of the vehicle from reaching the screwed fastener members of the mirror assembly. In addition, a waved leaf spring 14 as shown in FIG. 5a is preferably interposed between the vehicle body panel 2 and the clip 12, to further ensure firm mounting of the mirror assembly without the need of forming the clip 12 and the angled hooks 3b with very high dimensional accuracy.

FIG. 6 illustrates another embodiment arranged to suit an outside rear view mirror equipped with a remote controller to adjust the direction of the mirror. To allow a flexible cable 15 of the remote controller to pass through, a notch 2a' is formed in the periphery of the first aperture 2a of the vehicle body panel 2, and an escape opening 3c in the base member 3 and a groove 12f in the clip 12. In other respects, this embodiment is the same as the first embodiment described above.

According to this invention, as will be understood from the preceding description, a mirror mounting body, a stud, a base member, a spring, a washer, a nut, etc. are made into an assembly in advance of mounting of the mirror body on a vehicle body panel. Therefore, there remains only a little work to be carried out inside the body panel. After placement of the assembly on the apertured area of the body panel, all that has to be done from the inside of the body panel is just to couple the clip 12 with the assembly and turn it through about 90°. Thus, compared with the traditional design, an outside rear view mirror unit is simplified in construction and made remarkably easy to mount on a vehicle body, eliminating the need for special tools and troublesome work inside a wheel arch. Accordingly, the overall manufacturing cost is reduced and when it is necessary to disassemble the mirror body because of repairing of the mirror body or the vehicle body panel, a remarkable ease in disassembling and reassembling is also very advantageous.

What is claimed is:

1. A motor vehicle comprising:
   an outside rear view mirror assembly comprising a stud, a mirror mounting body pivotally connected at a bottom end portion to one end of said stud, a platy base member having an aperture through which extends said stud, and means for resiliently coupling said stud with said base member such that said mirror mounting body rests on a top side of said base member and is biased toward said base member, said base member having two angled hooks projecting from a bottom side in an opposite arrangement with respect to said stud;
   a vehicle body panel on which is placed said base member of said assembly, said panel being formed with a first aperture through which extends said stud and two second apertures through which protrude said two hooks, respectively, from the inside of said panel; and
   a clip which has two claw portions shaped and arranged to tightly engage with said two hooks, respectively and has been brought into contact with the inside of said panel in such an orientation that said two claw portions are in engagement with said two hooks, respectively, to secure said assembly to said panel.

2. A motor vehicle as claimed in claim 1, wherein said base member has a tubular portion which protrudes from the bottom side and extends through said first aperture of said panel, said aperture of said base member opening into the interior of said tubular portion such that said stud extends through said tubular portion, said means comprising a helical spring received in the interior of said tubular portion to surround said stud and a retainer attached to said stud so as to keep said spring in a compressed state, said clip having a central portion so shaped as to surround said tubular portion at least partially.

3. A motor vehicle as claimed in claim 2, further comprising a cap attached to the bottom end of said tubular portion.

4. A motor vehicle as claimed in claim 1, further comprising a resilient sheet interposed between said base member and said body panel to enhance securing of said assembly to said panel.

5. A motor vehicle as claimed in claim 1, further comprising a waved leaf spring interposed between said body panel and said clip.

* * * * *